United States Patent [19]
Lebizay et al.

[11] Patent Number: 6,144,658
[45] Date of Patent: Nov. 7, 2000

[54] REPETITIVE PATTERN REMOVAL IN A VOICE CHANNEL OF A COMMUNICATION NETWORK

[75] Inventors: Gerard Lebizay, Vence; Maurice Duault, Saint Laurent du Var; Bernard Pucci, Cagnes sur Mer; Gerard Richter, Saint Jeannet, all of France

[73] Assignee: Cisco Technology, Inc., San Jose, Calif.

[21] Appl. No.: 08/989,585

[22] Filed: Dec. 12, 1997

(Under 37 CFR 1.47)

[30] Foreign Application Priority Data

Dec. 20, 1996 [EP] European Pat. Off. .............. 96480123

[51] Int. Cl.[7] .............................. H04L 12/66; H04L 7/00; H04J 3/18
[52] U.S. Cl. ........................... 370/352; 370/477; 375/368
[58] Field of Search ................................... 341/51, 60, 63, 341/87; 370/352, 428, 474, 477, 493, 465, 528; 375/243, 246, 253, 368; 704/246, 253, 500; 714/715, 716, 822

[56] References Cited

U.S. PATENT DOCUMENTS

| | | | |
|---|---|---|---|
| 5,020,058 | 5/1991 | Holden et al. | 370/109 |
| 5,434,568 | 7/1995 | Moll | 341/87 |
| 5,442,351 | 8/1995 | Horspool et al. | 341/51 |
| 5,701,301 | 12/1997 | Weisser, Jr. | 370/428 |
| 5,844,508 | 12/1998 | Murashita et al. | 341/51 |

*Primary Examiner*—Alpus H. Hsu
*Assistant Examiner*—Duc Ho
*Attorney, Agent, or Firm*—Cesari and McKenna, LLP

[57] ABSTRACT

Repetitive packets in a voice/data stream, are detected and suppressed in the transmitting side of a network, after a predefined number of consecutive repetitive packets have been transmitted. Then, at the receiving side of the network, suppressed repetitive packets are reconstituted by filling the resulting gap in the voice/data stream with the repetitive pattern contained in the last received repetitive packet. When the input voice/data stream is compressed, only non-repetitive packets are compressed so that repetitive patterns are not corrupted by compression.

12 Claims, 7 Drawing Sheets

Repetitive Pattern Suppression for PCM

Repetitive Pattern Suppression for compressed voice

REPETITIVE PATTERN REMOVAL IN A VOICE CHANNEL OF A COMMUNICATION NETWORK

TECHNICAL FIELD

The present invention relates to the transport of voice data in packet or cell switching networks such as Frame Relay or ATM (Asynchronous Transfer Mode) networks and more particularly to a function of repetitive pattern removel (RPR).

BACKGROUND ART

In digital networks, voice is encoded with a PCM (Pulse Code Modulation) coding system which provides a constant bit rate of 64 Kbps (thousand bits per second). This bit rate corresponds to the sampling of the voice analog signal at the rate of 8,000 times per second, each sample being represented by 8 bits. In order to transport this voice signal across a packet or cell switching network, 8-bit samples are assembled into packets.

Packetized systems permit multiplexing of voice and data traffic from several users so that they may share transmission bandwidth and switching resources. A packet header includes the necessary control information allowing a wide range of coding schemes for voice and data and thus easy integration of multimedia traffic (voice, video and data). The packet switching networks considered for the present invention are either packet based such as Frame Relay or cell based such as Asynchronous Transfer Mode (ATM) networks. One major requirement in such networks is the efficient management of the bandwidth allocation in order to reduce the transmission costs. One way of saving bandwidth is to reduce the bit rate required from the 64 Kbps standard rate by applying compression techniques. Many voice compression algorithms rely on the fact that a voice signal has considerable redundancy (i.e. the general characteristics of the next few samples can be predicted from the last few). One common coding scheme based on prediction, which reduces the data rate to 32 Kbps without measurable loss of quality, is called Adaptive Differential PCM (ADPCM). In concept ADPCM encodes each sample as the difference between it and the last sample, rather than as an absolute amplitude value. Another compression technique is the analysis by synthesis method, an example of which is the Global System for Mobile communications (GSM) standard for European Cellular Telecommunications System. By using the GSM compression technique, the bit rate of a voice data stream can be reduced from the standard 64 Kbps to around 13 Kbps. As well as saving bandwidth, the compression algorithm must be efficient in terms of quality, which means that a listener must not detect the difference between an original analog signal and one which has been encoded and later decoded.

Another way of saving bandwidth is to detect in the voice data stream when there is no actual speech (i.e. silence) and just stop sending data during the gaps. This silence removal function consists of detecting the silence and halting transmission of voice packets at the transmitting side of the network and generating a background noise instead of silence at the receiving side.

Voice communication facilities, such as a PBX (Private Branch exchange) attached to a transmitting node (i.e. an access node of a digital network), may transmit repetitive patterns, )e.g. when a voice channel is idle). It is possible to save bandwidth by detecting the presence of repetitive patterns over the communication channel and stop the transmission of the corresponding data packets from the transmitting node to a receiving node of the digital network. At the receiving node the repetitive patterns should be regenerated in order to maintain the integrity of the data stream transmitted toward a destination communication facility such as a second PBX attached to the digital network.

Such techniques already exist in the background art. One simple technique uses a static configuration of the repetitive pattern to be detected in the transmitting side of the network. Then, once this pattern has been detected and the idle state of the voice channel confirmed, the packet transmission to the receiving node is interrupted. At the receiving side of the network, the repetitive pattern is regenerated and inserted in the output samples stream. A disadvantage of this technique is that if the binary value of the repetitive pattern changes (i.e. differs from the configured value), as in case of a different protocol used by the emitting device (e.g. PBX), the transmission of the repetitive pattern is not stopped unless its value is reconfigured in the repetitive pattern detection system. Thus, this technique has the drawback of being protocol dependent.

A technique that overcomes the above problem of protocol dependency consists of sending, after detection of a repetitive pattern in the receiving side, a control packet which provides the receiving side with the repetitive pattern value to be played out in the output samples stream, after that the transmission is interrupted. This technique requires a specific packet header format for carrying out the control packet recognition. This type of format is not available for ATM Adaptation Layer of type 0 and 1 (AAL0, AAL1).

Still another technique is disclosed in U.S. Pat. No. 5,020,058 issued on May 28, 1991 to B. D. Holden et al. entitled "Packet voice/data communication system having protocol independent repetitive packet suppression". According to this patent, the repetitive pattern suppression technique utilizes a compression/expansion algorithm. On the compression side, the repetitive pattern suppression (RPS) technique looks for repeating patterns in an incoming data stream. The RPS compression side suppresses the transmission of entire packets when a repeating pattern has been established in the last sample of the previous packet, and then is found to repeat throughout the current packet. Whenever a packet does not arrive in time to be played out to the user, the expansion part of the RPS algorithm fills (replicates) the resulting hole in the data stream with the last sample from the previously received packet. This latter technique does not require control packet and is protocol independent but presents some vulnerability in case of dropped packet errors. Indeed, the RPS algorithm disclosed in that patent does not allow, at the receiving side, for the difference between a suppressed packet and a dropped packet during transmission, and the fill pattern for the missing packet is derived from whatever sample pattern lands at the end of the previous packet.

Furthermore, none of the techniques presented above address the case of repetitive pattern removal when voice is compressed, using for example a GSM algorithm. It is still possible to detect repetitive patterns in the incoming encoded packets at the transmitting side of the network and stop the transmission of the next repetitive packets. But, after the decoding of a repetitive packet at the receiving side, the repetitive pattern binary value obtained has a very low probability of complying with the original repetitive pattern before it was encoded and transmitted. This is due to the nature of a compression algorithm such as GSM, which was developed for speech but not for data. As the repetitive pattern value can provide information to the destination device such as information on the state of the connection (e.g. idle state), it is necessary not to corrupt the value of the repetitive pattern during the encoding/decoding process.

SUMMARY OF THE INVENTION

Therefore, an object of the present invention is to provide an improved repetitive pattern removal (RPR) function to apply to a voice/data stream, which may be compressed, in order to reduce the bit rate required during transmission of said voice/data stream from a transmitting side to one or more receiving sides of a cell/packet switching network.

In accordance with the present invention, repetitive packets in a voice/data stream, are detected and suppressed in the transmitting side of a network after a predefined number of consecutive repetitive packets have been transmitted. Then, at the receiving side of the network, suppressed repetitive packets are reconstituted by filling the resulting gap in the voice/data stream with the repetitive pattern contained in the last received repetitive packet. When the input voice/data stream is compressed, only non-repetitive packets are compressed so that repetitive patterns are not corrupted by compression.

The repetitive pattern removal function provided by the invention is not protocol dependent, it does not use a signalling or control packet, it allows the input voice/data signal compression concurrently with the suppression of repetitive patterns and their reconstitution in the output signal. Furthermore it is more secure in case of transmission fails such as dropped packets, by sending before suppression, a predefined number of repetitive packets so that the receiving side can differentiate between dropped packets and removed repetitive packets.

DETAILED DESCRIPTION OF PREFERRED EMBODIMENT(S) OF THE INVENTION

Figure 1:
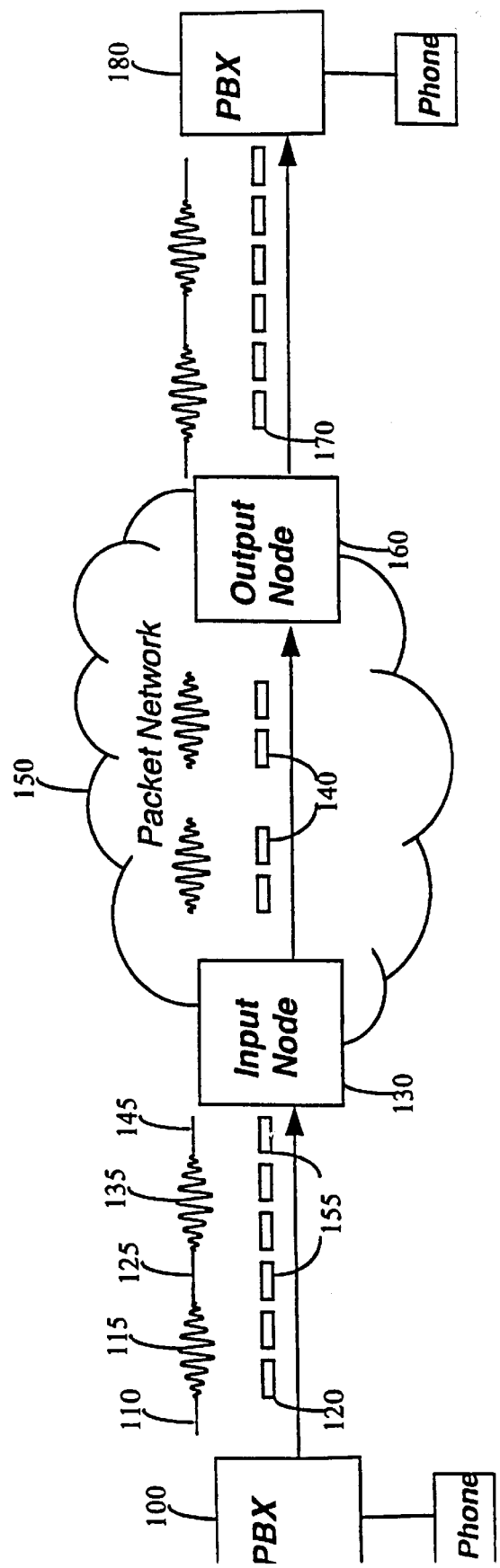
FIG. 1 shows a voice signal and its corresponding voice channel data stream transported over a typically configured packet/cell network.

Referring to FIG. 1 two PBX's communicate to each other through a communication network. A voice signal 110 is transported from a PBX 100 in a standard 64 kbps voice channel as an incoming stream of voice samples 120 to an input access node 130, so-called packet transmitting side, of a packet/cell switching communication network 150. In the input access node the stream of voice samples 120 is packetized and transported through the network as a stream of network packets 140 to a network output access node 160, so-called packet receiving side. The output node 160 provides to the destination PBX 180 an output stream of samples 170, as a standard 64 kbps voice channel, which should be identical to the input samples stream 120. The voice samples 120 enter the network at a constant bit rate of 64 kbps in PCM mode. Optionally, in the input node 130, the voice samples are compressed using a GSM algorithm, and decompressed at the output node 160. The voice signal 110 is a succession of speech periods (115, 135) and idle periods (125, 145) wherein the PBX 100 sends a repetitive pattern 155 which is indicative of the idle state of the voice channel. A general object of the present invention is to avoid the transmission of these repetitive patterns inside the network from the input node, and to regenerate them at the output node such that the original data stream 120 is reconstituted in the output data stream 170.

Figure 2:
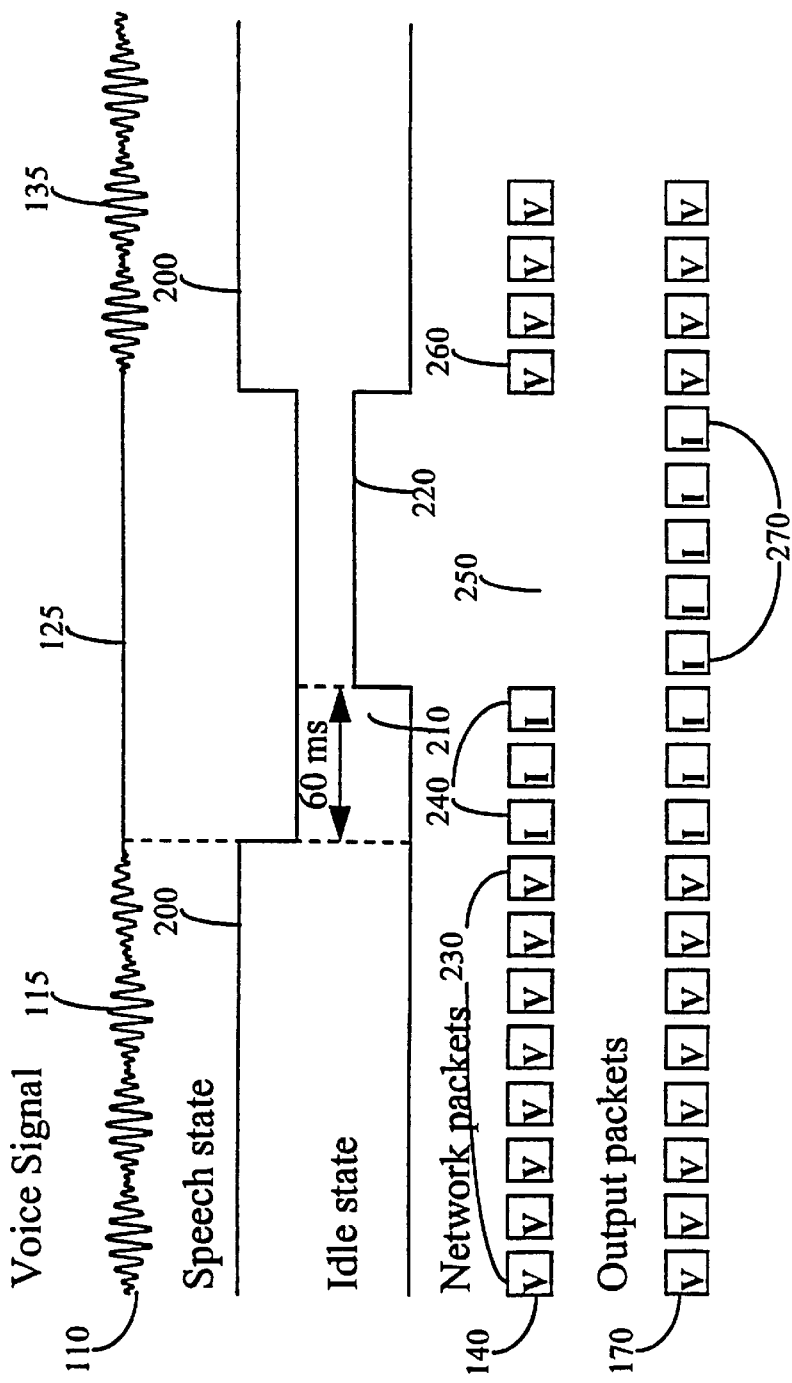
FIG. 2 is an illustration of the RPR technique for non-compressed voice.

FIG. 2 shows the repetitive pattern removal (RPR) technique applied to non-compressed voice signals. The voice signal 110 of FIG. 1 is issued from a standard 64 kbps PCM voice channel and comprises an idle period 125 between two speech periods (115, 135). In the network transmitting side of the preferred embodiment, the voice signal is available as a packets stream, each packet including 160 8-bit samples or patterns. As the bit rate of the incoming voice signal is 64 kbps, i.e. one sample every 125 microseconds, there is one packet every 20 milliseconds (ms). Therefore, a network packet stream 140 is sent from the transmitting side to the receiving side of the network. The data transmitted through the network may be embedded inside the payload of an ATM cell, a Frame Relay frame, a IP (Internet Protocol) packet or inside the payload of a packet of any packet switching technology. During the first speech period 115, the RPR system is in speech state 200 and voice samples network packets 230 are sent from the transmitting side. When the voice channel turns to idle state 125, an idle pattern is generated and repetitive packets 240 (idle packets) flow into the transmitting side. The RPR system detects that there is a predefined number N1 (N1=3 in the preferred embodiment) of successive repetitive packets 240 containing the same repeated pattern, and turns to idle state 220, after the N1 repetitive packets have been transmitted. The transmission of the N1 repetitive packets corresponds to a time period 210 of N1*20 ms (where * denotes multiplication; if N1=3 the period is 60 ms). Then the RPR system holds the transmission 250 until non-repetitive packets e.g. speech packets are detected and the transmission starts again by sending the corresponding network packets 260. In the receiving side of the network, an output packet stream 170 is emitted with idle packets 270 inserted in the gap that corresponds to repetitive packets suppressed. These packets inserted are filled with the repetitive pattern that was extracted from the N1 idle packets 240 that were received.

Figure 3:
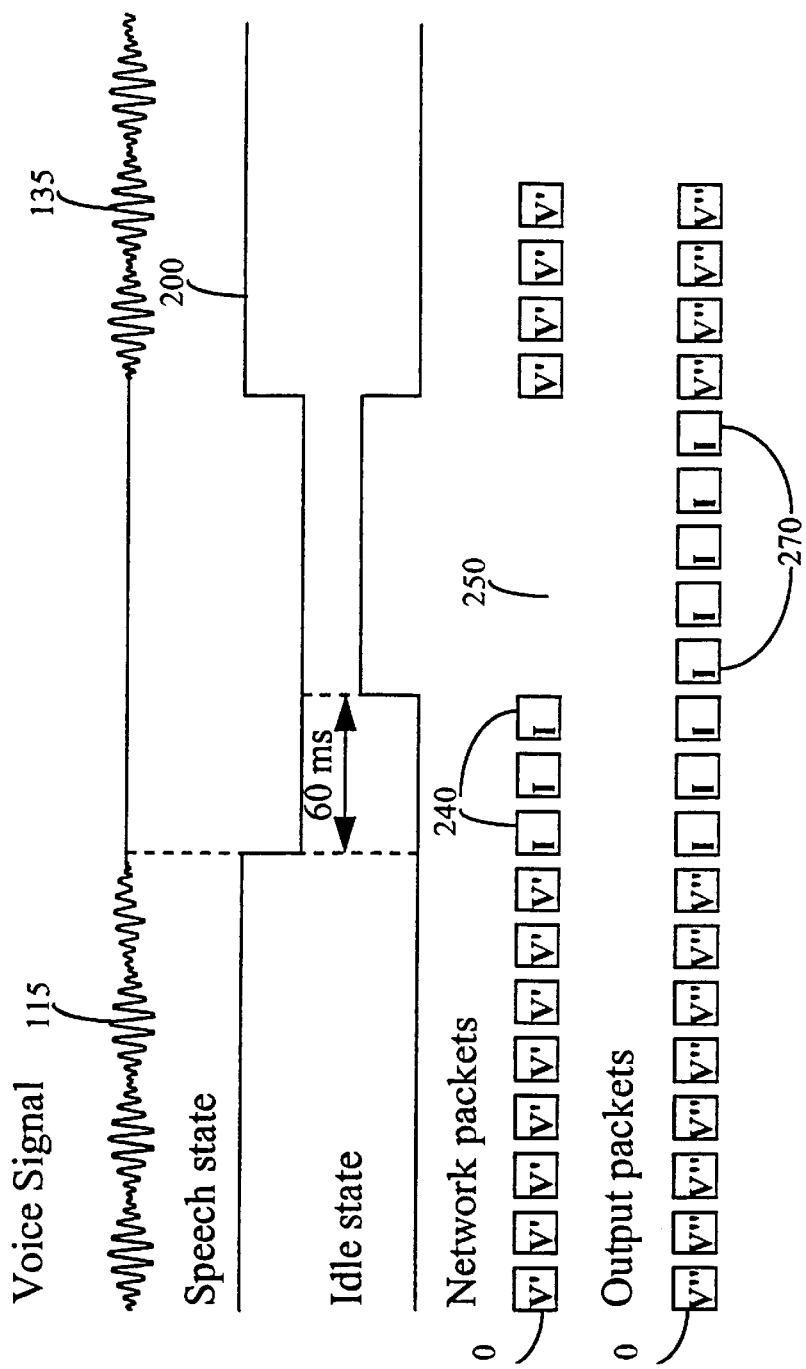
FIG. 3 is an illustration of the RPR technique for compressed voice.

Now referring to FIG. 3 there is shown an illustration of the RPR technique applied to compressed voice. The incoming packets 140 are compressed when they correspond to speech samples 115. A GSM algorithm is applied for reducing the bit rate from 64 kbps to 13 kbps. Speech packets are compressed (V') and transmitted. When idle packets are detected the compression operation is stopped and a number N1 of non-compressed idle packets 240 is transmitted, in network format, as in FIG. 2. In the receiving side speech packets are decompressed providing output speech packets V" and, as in FIG. 2, idle packets 270 are inserted in the gap 250 that corresponds to repetitive packets suppressed. Repetitive packets are not compressed because a compression algorithm such as GSM, which is made for speech, would corrupt the value of the idle pattern contained in the N1 idle packets transmitted, from which the receiving side extracts the repetitive pattern to play out in the output data stream. In the preferred embodiment, the N1 repetitive packets are not compressed when they are transmitted, but they have the same size as compressed voice packets so as to keep the same bit rate. In this case, the receiving side expands these repetitive packets to provide the original size of 160 patterns per packet, so that they can be played out.

Figure 4:
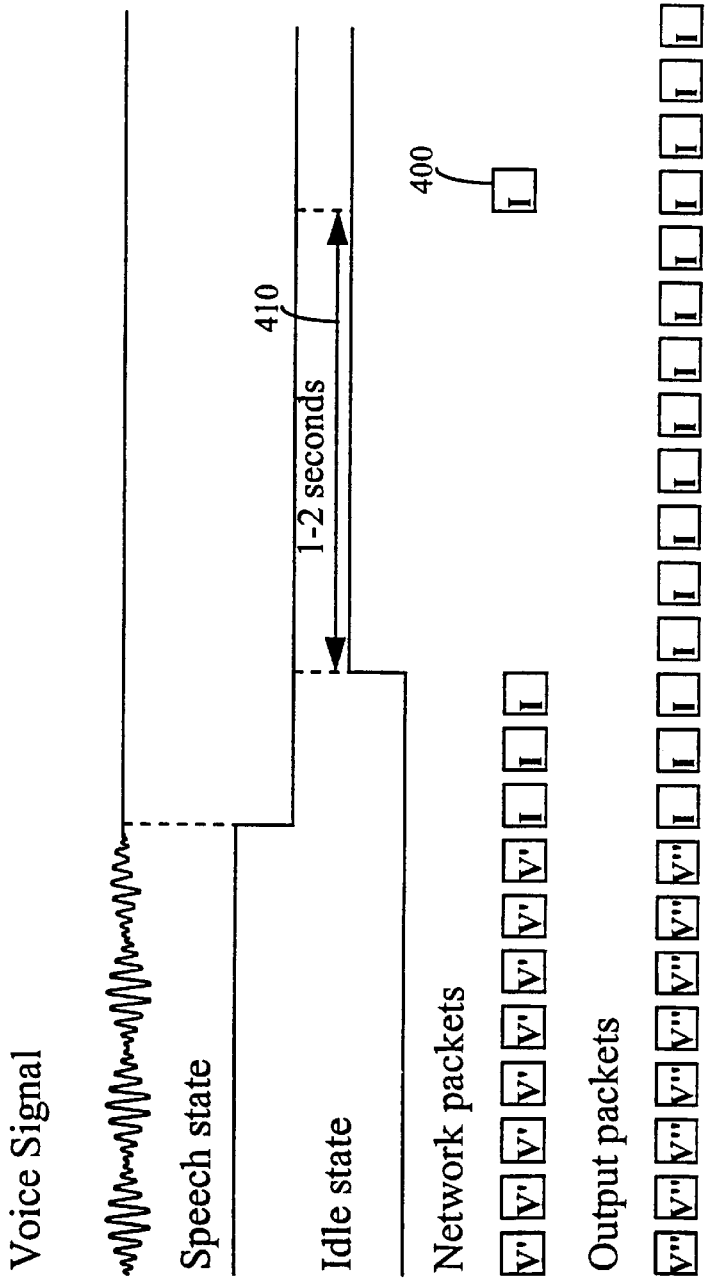
FIG. 4 is an illustration of the RPR periodic refresh function for robustness purpose.

FIG. 4 is an illustration of a periodic refresh function included in the RPR system which can be used for transmitting compressed or non-compressed voice/data stream. This function consists in sending a certain number of network repetitive packets 400 (in the preferred embodiment this number is one) after a predefined number N2 of consecutive repetitive packets have been suppressed, which corresponds, in the preferred embodiment, to a period of time of 1 or 2 seconds 410. The purpose of the periodic refresh is to maintain data integrity in case of transmission problems, thus improving the robustness of the transmission. For example, if transmission problems such as dropped packets occurs so that none of the N1 idle packets are transmitted, the receiving side does not receive any packet and does not "know" that the state of the line is idle. In this case the receiving side can play silence or digital speech interpolation (DSI) until the refresh repetitive packet is received which allows the receiving side to play the repetitive pattern in the output data stream. More generally, if the receiving side receives no packet during a number of consecutive refresh periods 410, this is indicative of connection problem or trunk failure.

Figure 5:
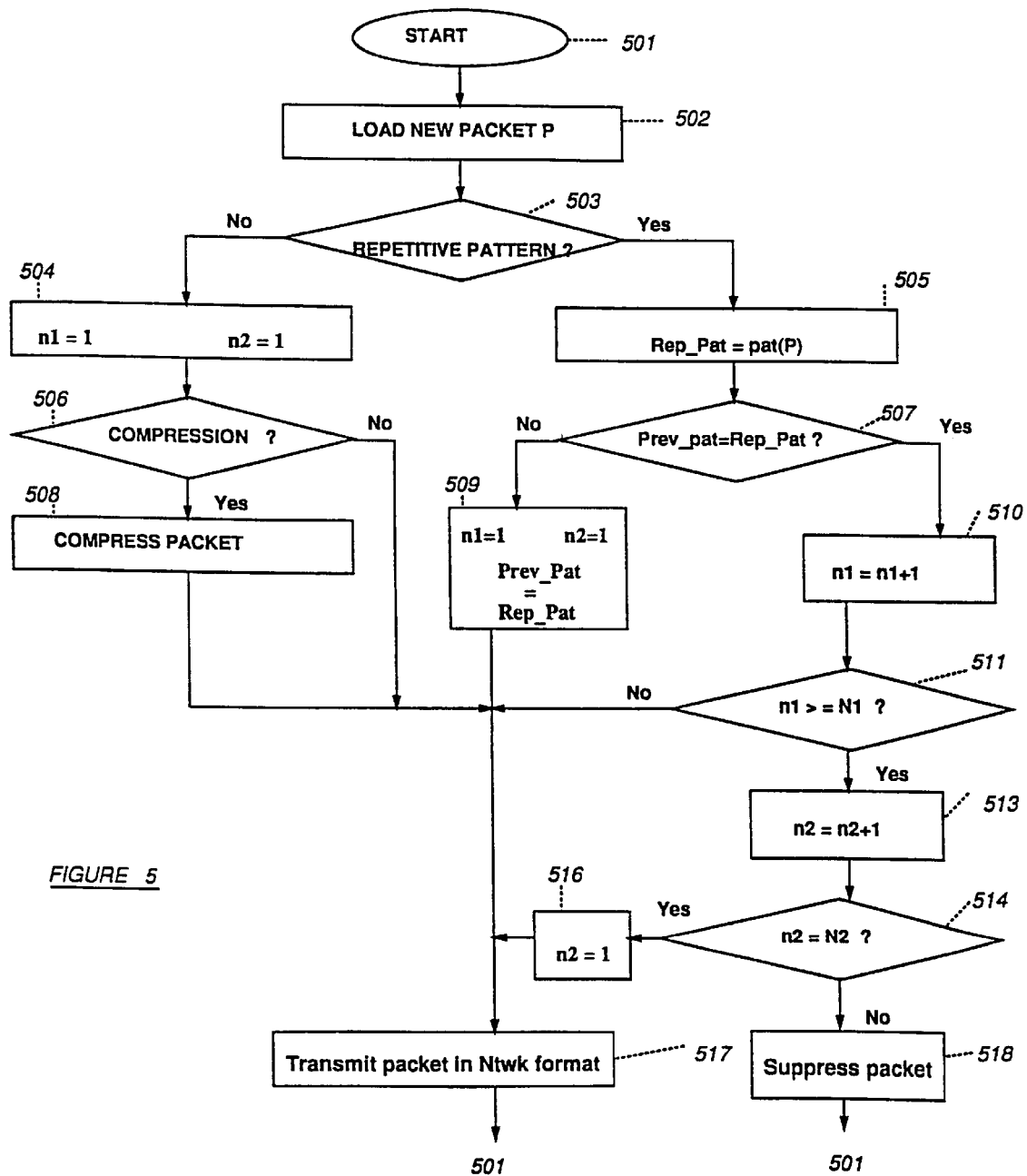
FIG. 5 shows a flow chart of the RPR algorithm functions performed at the transmitting side of the network.

FIG. 5 is a flow chart showing the functions of the Repetitive Pattern Removal system performed at the transmitting side of the network. Starting in step 501, the process starts by loading in 502, a new incoming packet P from the input voice/data stream. Then in step 503 the RPR system determines if the new packet is repetitive or not. In the preferred embodiment each incoming packet contains 160 8-bit patterns representing PCM encoded speech samples or voiceband data (e.g. fax data). As the bit rate of the voice channel is 64 kbps there is one new packet every 20 milliseconds. If new packet P is repetitive, the repetitive pattern pat(P) that it contains, is stored in a register Rep—Pat (505). In step 507, the repetitive pattern (RP) previously stored in a register Prev—Pat, is compared to the new RP stored in Rep—Pat. If previous and new RPs are equal, which means that previous packet and new packet are repetitive and identical, a first counter n1 is incremented (510). Then, in step 511, the value of counter n1 is compared to a predefined number N1 (N1=3 in the preferred embodiment). If n1 is smaller than N1 (512), signifying that less than N1 successive identical repetitive packets have been detected, new packet P is transmitted (517). On the other hand, if n1 is greater or equal to N1, signifying that at least N1 successive identical repetitive packets have been detected, a second counter n2 is incremented (513) and compared, in 514, to a predefined number N2. If less than N2 repetitive packets have been suppressed (515), new packet P is suppressed (518). However, if n2 is equal to N2 signifying that N2 successive identical repetitive packets have been suppressed then counter n2 is reinitialized to one (516) and repetitive packet P is transmitted (517). The transmission of this (N2+1)$^{th}$ repetitive packet is the implementation of the periodic refresh function illustrated in FIG. 4. The period of the refresh corresponds to N2*20 ms. For a period of 1 second, the value of N2 is 50. If in step 507, the previous and new repetitive patterns are different, counters n1 and n2 are reinitialized to one (509), and register Prev—Pat is loaded with new repetitive pattern stored in Rep—Pat. Then packet P is transmitted (517). In step 503, if the new packet is a non-repetitive packet, counters n1 and n2 are reinitialized to one (504). Then, a selector 506 provides the possibility of compressing (branch YES) or not (branch NO) the new packet. For example, a GSM compression technique is applied (508) if packet P contains speech patterns (samples), and it is not applied if packet P contains voiceband data patterns (e.g fax/modem data). Then non-repetitive packet P is transmitted in cell/packet network format (517). Finally, a new cycle starts by returning to step 501.

Repetitive pattern detection

The repetitive pattern detector of the present invention applies for two different situations. The first is when a voice channel idles with all 8-bit patterns having the same value. And the second is when, as in the U.S. technique of Channel Associating Signalling (CAS), the last bit of one 8-bit pattern every six patterns is used for signalling. In this case, when the channel idles, one pattern of every six is different, due to its last bit. To comply with both situations, the repetitive pattern detector of the present invention proceeds as follows.

For every input packet (160 8-bit patterns)
a) One pattern is taken and is "masked" with 11111110 binary so that only the first seven bits are considered.
b) The "masked" pattern is compared with the preceding "masked" one.
c) If there is a difference, the channel is not in "idle" state; the process is terminated for the current packet (take a new input packet).
d) If there is no difference, a new pattern is taken (go to a)).

The packet is "idle" (repetitive) if all its "masked" patterns are equal.

Now to determine the real value (not "masked") of the "idle" pattern within the current packet, it is sufficient to find five non-masked successive patterns with the same value. This latter value is the repetitive pattern to be transmitted to the receiving side of the network.

Figure 6:
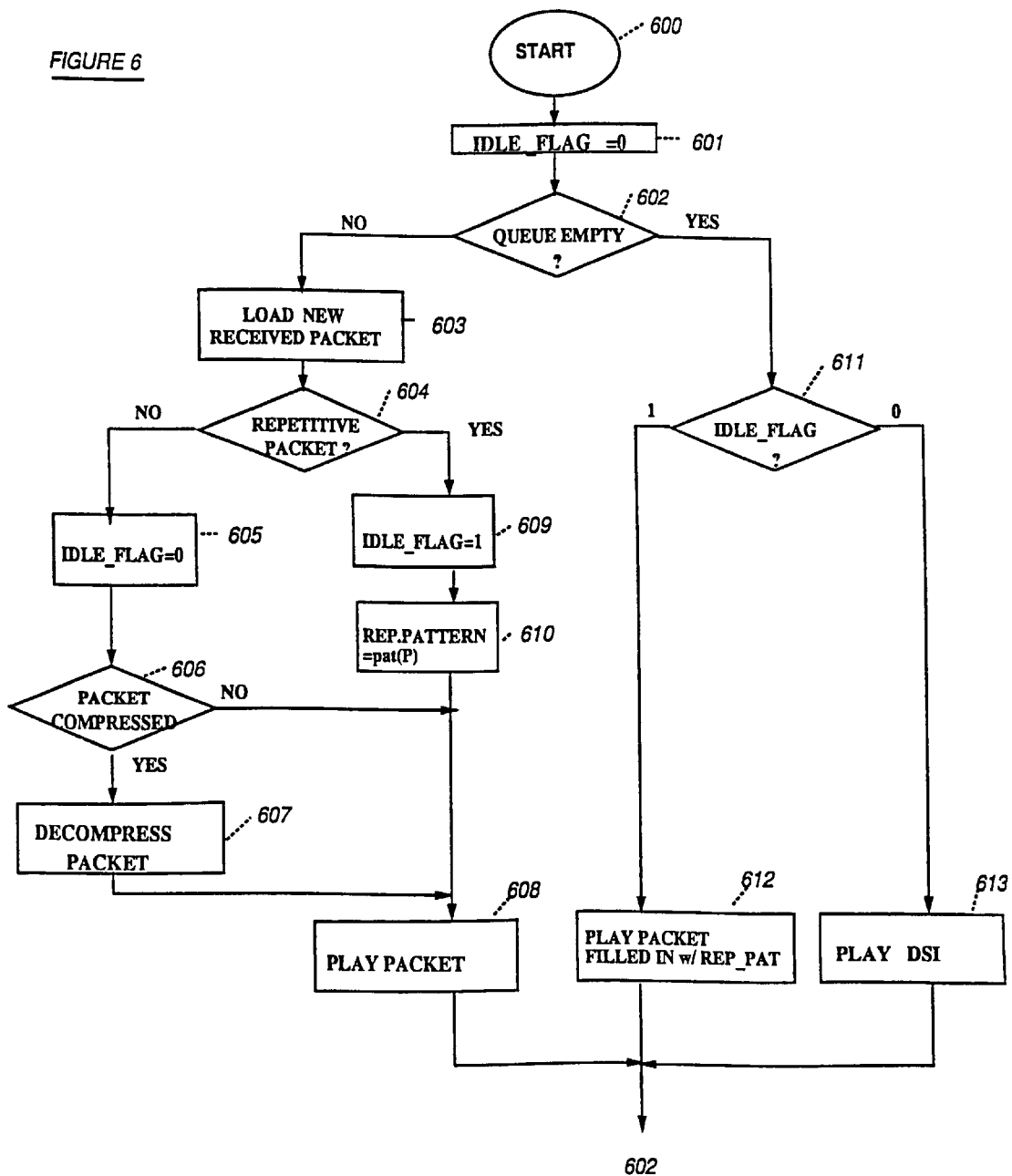
FIG. 6 shows a flow chart of the RPR algorithm functions performed at the receiving side of the network.

FIG. 6 is a flow chart showing the functions of the Repetitive Pattern Removal system performed at the receiving side of the network. The process starts (600) by resetting (601), Idle—Flag, indicative of the repetitive patterns transmission state (e.g. idle state) of the voice channel connected to the transmitting side. In step 602, an input queue (e.g. FIFO), receiving the incoming packets from the transmitting side, is checked. If the queue is not empty (branch NO), a packet (the first arrived in the queue) is loaded (603). This packet, called new received packet P, is analyzed for determining if it is repetitive or not (604). If new packet p is not repetitive (branch No), Idle—Flag is set to 0 (605). Then, it is determined in step 606 if packet P is compressed or not. If p is compressed (branch YES), it is decompressed (607) before it is played out in the output signal (608). If new packet p is not compressed (606, branch NO), it is directly played out in the output signal (608). Then a new cycle starts by checking this queue (602). Returning to step 604, if new packet p is repetitive (branch YES), Idle—Flag is set to 1 (609). In following step 610, the repetitive pattern pat(P) contained in packet p, is stored in a register Rep—Pat. Then, repetitive packet p is played out in the output signal (608) and a new cycle begins (602).

In step 602, if the queue is empty (branch YES), the value of Idle—Flag is tested (611). If Idle—Flag value is 1, this signifies that the last packet received was a repetitive packet and that the transmitting side is suppressing repetitive packets. A repetitive packet is then reconstituted, filled in with the last repetitive pattern stored in Rep—Pat, and played out in the output signal (612), so that the original voice/data stream is reconstituted, and a new cycle begins (602). If Idle—Flag value is 0 (611, branch 0), this signifies that the last packet received was not repetitive and thus, the voice channel is not idle. Consequently, a transmission problem is identified and the receiving side takes a decision such as playing Digital Speech Interpolation 613 (in case of a speech communication was established) and the queue is tested again (602).

Figure 7:
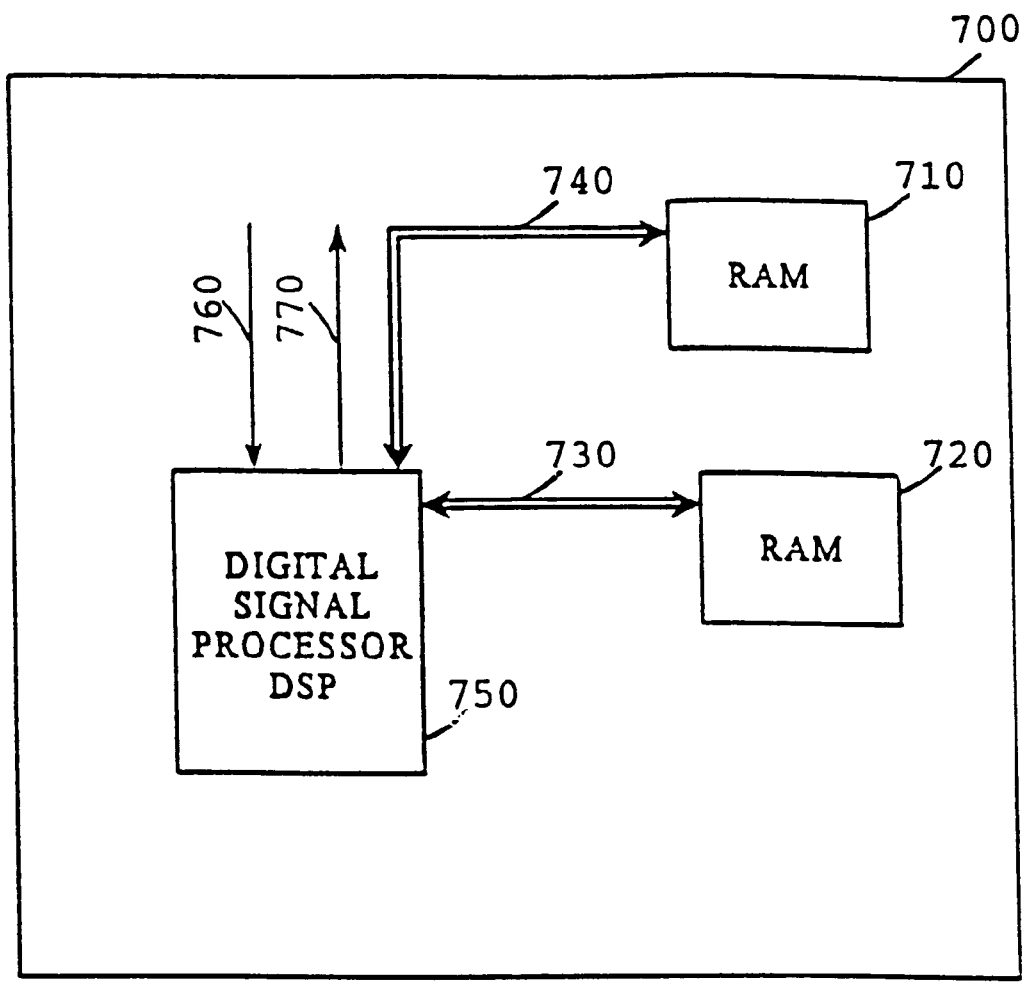
FIG. 7 illustrates the implementation of the RPR algorithm as a program running in an adapter card of a telecommunication access node dedicated to voice processing.

In the access nodes of a communication network according to the invention, the implementation of processing functions such as voice compression is done in a dedicated voice traffic adapter card. FIG. 7 illustrates the components related to the repetitive packet removal function in the dedicated voice traffic adapter card 700 the program instructions are stored in a first RAM storage unit 710 and are read via the bus 740, in a Digital Signal Processor 750 or a pool of DSPs which stores the data for instruction execution in a second RAM storage unit 720 accessed through a bus 730. Input voice packets arrive in the DSP through the input serial link 760 and are sent out through the output serial link 770. The DSP 750 can also be used for running the voice compression algorithms. The adapter card 700 also contains the components for carrying out common routing functions using input and output serial links 760 and 770 as communication means.

While the invention has been described with respect to the illustrated embodiments, it will be understood by those skilled in the art that various changes and modifications can be made without departing from the scope of the invention.

What is claimed is:

1. A voice/data traffic managing system in a packet switching network for operating on a voice/data stream, comprising:

a transmitting side with detection means for detecting in said voice/data stream the presence of one or more packets filled with repetitive patterns (repetitive packets), and removal means for suppressing said repetitive packets after a predefined number (N1) of consecutive repetitive packets have been transmitted, such that they are not transmitted, and encoding means for compressing said voice/data stream, but not compressing said predefined number of transmitted repetitive packets; and, a receiving side with reconstitution means for replicating the last repetitive packet received from the transmitting side into the portion of said voice/data stream which corresponds to the suppressed data packets, such that said voice/data stream is reconstituted and played out as an output voice/data signal, and decoding means for decompressing said voice/data stream, said decoding means not decoding repetitive packets so that the patterns within repetitive packets are not corrupted by decompression at said receiving side.

2. A system according to claim 1 further comprising refresh means at the transmitting side for sending a certain number of repetitive packets, for transmission errors recovery, after a predefined number (N2) of repetitive packets have been suppressed.

3. A system according to claim 1 comprising a queue at the receiving side for queuing the successive packets received from the transmitting side, means for determining whether said queue is empty or not, and means for storing the repetitive pattern contained in the last repetitive packet received.

4. A system according to claim 3 comprising at said receiving side, means for applying digital speech interpolation to the output signal when said queue is empty and the last received packet is a non-repetitive packet.

5. A system according to claim 4 wherein, means at said receiving side for playing out said stored repetitive pattern when said queue is empty and the last received packet is a repetitive packet.

6. A system according to claim 5 wherein all called for means are implemented in software.

7. A method for transporting an incoming stream of voice/data in a transmitting side to a receiving side of a packet switching network, comprising:

a) detecting in said voice/data stream at the transmitting side the presence of one or more packets filled with repetitive patterns;

b) transmitting from the transmitting side a predefined number (N1) of consecutive repetitive packets after detection of such packets and removing the next repetitive packets such that they are not transmitted;

c) transmitting the non-repetitive packets in a compressed state, and transmitting those repetitive packets in a non-compressed state;

d) decompressing at the receiving side those non-repetitive packets which were transmitted in a compressed state; and e) replicating the last repetitive packet received from the transmitting side into the portion of the received packets stream which corresponds to the suppressed packets, such that said voice/data stream is reconstituted for being played out as an output voice/data signal.

8. A method according to claim 7 including the step of sending a certain number of repetitive packets for transmission error recovery, after a predefined number (N2) of repetitive packets have been suppressed.

9. A voice/data traffic managing system in a packet switching network for operating on a voice/data stream, comprising:

at the transmitting side, detection means for detecting in said voice/data stream the presence of one or more packets filled with repetitive patterns (repetitive packets);

removal means for suppressing said repetitive packets after a predefined number (N1) of consecutive repetitive packets have been transmitted, such that they are not transmitted;

refresh means for sending a certain number of repetitive packets, for transmission errors recovery, after a predefined number (N2) of repetitive packets have been suppressed;

at the receiving side, reconstitution means for replicating the last repetitive packet received from the transmitting side into the portion of said voice/data stream which corresponds to the suppressed data packets, such that said voice/data stream is reconstituted and played out as an output voice/data signal; and, error recovery means, responsive to said refresh packets, for recovery from transmission errors in the absence of receiving said refresh packets.

10. A method for transporting an incoming stream of voice/data from a transmitting side to a receiving side of a packet switching network, comprising:

at the transmitting side, a) detecting in said voice/data stream the presence of one or more packets filled with repetitive patterns (repetitive packets);

b) transmitting a predefined number (N1) of consecutive repetitive packets after detection of such packets and removing the next repetitive packets such that they are not transmitted;

c) sending a certain number of repetitive packets for transmission errors recovery, after a predefined number (N2) of repetitive packets have been suppressed;

at the receiving side, d) replicating the last repetitive packet received from the transmitting side into the portion of the received packets stream which corresponds to the suppressed packets, such that said voice/data stream is reconstituted for being played out as an output voice/data signal;

e) recovering from transmission errors in response to not receiving those repetitive packets transmitted for transmission errors recovery.

11. A voice/data traffic managing system in a packet switching network for transmitting a voice/data stream, comprising:

a transmitter with detection means for detecting in said voice/data stream the presence of one or more packets filled with repetitive patterns (repetitive packets), and removal means for suppressing said repetitive packets after a predefined number (N1) of consecutive repetitive packets have been transmitted, such that they are not transmitted, and encoding means for compressing said voice/data stream, but not compressing said predefined number of transmitted repetitive packets, so that a receiver having a reconstitution means for replicating the last repetitive packet received from the transmitter into the portion of said voice/data stream which corresponds to the suppressed data packets, such that said voice/data stream is reconstituted and played out as an output voice/data signal, and said receiver further having decoding means for decompressing said voice/data stream, said decoding means not decoding repetitive packets so that the patterns within repetitive packets are not corrupted by decompression at said receiver.

12. A method for transmitting an incoming stream of voice/data onto a packet switching network, comprising:

a) detecting in said voice/data stream at a transmitter the presence of one or more packets filled with repetitive patterns;

b) transmitting by said transmitter a predefined number (N1) of consecutive repetitive packets after detection of such packets and removing the next repetitive packets such that they are not transmitted;

c) transmitting the non-repetitive packets in a compressed state, and transmitting those repetitive packets in a non-compressed state;

d) decompressing at the receiving side those non-repetitive packets which were transmitted in a compressed state; and e) replicating the last repetitive packet received from the transmitting side into the portion of the received packets stream which corresponds to the suppressed packets, such that said voice/data stream is reconstituted for being played out as an output voice/data signal.

* * * * *